United States Patent
He et al.

(10) Patent No.: US 10,621,186 B2
(45) Date of Patent: Apr. 14, 2020

(54) APPLICATION RECOMMENDATION METHOD, SERVER, AND COMPUTER READABLE MEDIUM

(71) Applicant: Tencent Technology (Shenzhen) Company Limited, Shenzhen, Guangdong (CN)

(72) Inventors: Ruiming He, Guangdong (CN); Yuan Tian, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 289 days.

(21) Appl. No.: 15/666,207

(22) Filed: Aug. 1, 2017

(65) Prior Publication Data
US 2017/0329785 A1  Nov. 16, 2017

Related U.S. Application Data

(63) Continuation of application No. PCT/CN2016/082299, filed on May 17, 2016.

(30) Foreign Application Priority Data

Jun. 23, 2015  (CN) .......................... 2015 1 0350222

(51) Int. Cl.
*G06F 16/20* (2019.01)
*G06F 16/2457* (2019.01)
(Continued)

(52) U.S. Cl.
CPC .......... *G06F 16/24578* (2019.01); *G06F 7/08* (2013.01); *G06F 16/2477* (2019.01);
(Continued)

(58) Field of Classification Search
None
See application file for complete search history.

(56) References Cited

U.S. PATENT DOCUMENTS

2013/0191397 A1* 7/2013 Avadhanam ...... G06F 16/24578
                                              707/748
2013/0232183 A1   9/2013 Lee et al.
(Continued)

FOREIGN PATENT DOCUMENTS

CN   101616356 A   12/2009
CN   102880501 A    1/2013
(Continued)

OTHER PUBLICATIONS

Office Action with Translation Issued for Korean Application No. 10-2017-7030016 dated Aug. 22, 2018.
(Continued)

*Primary Examiner* — Kristopher Andersen
(74) *Attorney, Agent, or Firm* — Knobbe, Martens, Olson & Bear, LLP

(57) ABSTRACT

In some embodiments, an application recommendation method includes: determining download times and user use times of each of multiple to-be-recommended applications; converting the download times and the user use times to be in a same order of magnitude, to obtain converted download times and converted user use times; performing weighting calculation on the converted download times, to obtain a download sorting weighted value of the application, and performing weighting calculation on the converted user use times, to obtain a use sorting weighted value of the application; obtaining a sorting value of each of the applications based on the download sorting weighted value and the use sorting weighted value of the application; and determining a sequence of the multiple applications on an application recommendation interface based on the sorting value of each of the applications.

17 Claims, 7 Drawing Sheets

(51) Int. Cl.
*G06F 16/25* (2019.01)
*G06F 16/2458* (2019.01)
*G06F 16/9535* (2019.01)
*G06F 7/08* (2006.01)
*H04L 29/08* (2006.01)
*G06F 16/90* (2019.01)
*H04W 4/35* (2018.01)

(52) U.S. Cl.
CPC ........ *G06F 16/258* (2019.01); *G06F 16/9535* (2019.01); *H04L 67/34* (2013.01); *H04W 4/35* (2018.02)

(56) References Cited

U.S. PATENT DOCUMENTS

| | | | |
|---|---|---|---|
| 2014/0006434 A1 | 1/2014 | Chervirala et al. | |
| 2014/0298025 A1* | 10/2014 | Burbank | H04L 63/0414 |
| | | | 713/171 |
| 2015/0120742 A1 | 4/2015 | Liu et al. | |
| 2015/0332373 A1 | 11/2015 | Pang et al. | |
| 2016/0127511 A1* | 5/2016 | Zhang | G06F 11/3068 |
| | | | 709/203 |

FOREIGN PATENT DOCUMENTS

| | | |
|---|---|---|
| CN | 103020845 A | 4/2013 |
| CN | 103049452 A | 4/2013 |
| CN | 103164505 A | 6/2013 |
| CN | 103514496 A | 1/2014 |
| CN | 104991914 A | 10/2015 |
| JP | 2013-054732 A | 3/2013 |
| KR | 10-2013-0089741 A | 8/2013 |
| KR | 10-2014-0140222 A | 12/2014 |

OTHER PUBLICATIONS

International Search Report for International Application No. PCT/CN2016/082299 dated Aug. 22, 2016 in 2 pages.

* cited by examiner

APPLICATION RECOMMENDATION METHOD, SERVER, AND COMPUTER READABLE MEDIUM

The application is a continuation of International Patent Application No. PCT/CN2016/082299 filled on May 17, 2016, which claims the priority to Chinese Patent Application No. 201510350222.0, titled "APPLICATION RECOMMENDATION METHOD AND SERVER", filed on Jun. 23, 2015 with the State Intellectual Property Office of the People's Republic of China, both of which are incorporated herein by reference in their entireties.

TECHNICAL FIELD

The present disclosure relates to the field of information recommendation technology, and in particular to an application recommendation method, a server and a computer readable medium.

BACKGROUND

With the popularity of intelligent operation systems, such as Android (Android), IOS, more and more applications are loaded on terminal devices. Hence, how to better provide application download services for the terminal device is more important. At present, an application download platform, such as an application store, is a major way for the terminal device to download applications. The application download platform may sort all applications and present the applications on an application recommendation interface. Generally, the application recommendation interface includes a home page of the application download platform or a class interface for each class. FIG. 1 is a schematic diagram of an application recommendation interface. The application download platform may sort all applications and present the applications on the home page. Apparently, in the case of the class interface, the application download platform may also classify applications, sort applications of each class, and present the applications on the class interface.

In recommending applications on the application recommendation interface of the application download platform, a recommendation position of an application (i.e., an ordinal number of the application) greatly affects a user's interest in the application. Hence, how to appropriately set the recommendation position of the application is a difficult problem in recommending applications. The current application recommendation method is mainly based on download times of the application to set the recommended position of the application. That is, a recommendation position of an application with high download times is before a recommendation position of an application with low download times.

However, an application in a front recommendation position should be an application that has high popularity and prevalence in a user use level. With the existing application recommendation method, there may be a case that high download times of an application represents the popularity and prevalence in a user use level. Especially, if an application has make-up download times, the application which has make-up download times but has low popularity and prevalence in a user use level, may still occupy a front recommendation position for a long time, and thus an inappropriate application is recommended. As a result, application recommendation positions set by the existing application recommendation method are very likely to mismatch the popularity and prevalence at a user level, resulting in inappropriate application recommendation. Therefore, how to improve the appropriateness of the application recommendation position arrangement and thus improve the appropriateness of the application recommendation is a problem that needs to be considered.

SUMMARY

In a view of the above, an application recommendation method, a server and a computer readable medium are provided according to an embodiment of the present disclosure, to improve the appropriateness of application recommendation position arrangement and thus improve the appropriateness of application recommendation.

In an aspect, the present disclosure provides an application recommendation method, applied to a server. The method includes:

determining download times and user use times of each of multiple to-be-recommended applications;

converting the download times and the user use times to be in a same order of magnitude, to obtain converted download times and converted user use times;

performing weighting calculation on the converted download times, to obtain a download sorting weighted value of the application, and performing weighting calculation on the converted user use times, to obtain a use sorting weighted value of the application;

obtaining a sorting value of each of the multiple applications based on the download sorting weighted value and the use sorting weighted value of the application; and determining a sequence of the multiple applications on an application recommendation interface based on the sorting value of each of the applications.

In a second aspect, the present disclosure provides a server, including:

a times determining module, configured to determine download times and user use times of each of multiple to-be-recommended applications;

a converting module, configured to convert the download times and the user use times to be in a same order of magnitude, to obtain converted download times and converted user use times;

a weighting module, configured to perform weighting calculation on the converted download times, to obtain a download sorting weighted value of the application, and perform weighting calculation on the converted user use times, to obtain a use sorting weighted value of the application;

a sorting module, configured to obtain a sorting value of each of the multiple applications based on the download sorting weighted value and the use sorting weighted value of the application; and a recommendation module, configured to determine a sequence of the multiple applications on an application recommendation interface based on the sorting value of each of the applications.

In a third aspect, the present disclosure provides a computer readable medium, configured to store one or more computer programs. The one or more computer programs include instructions executable by a processor including one or more storages, to perform the above application recommendation method.

Based on the above technical solution, in the application recommendation method according to embodiments of the present disclosure, in recommending multiple to-be-recommended applications, download times and user use times of each of the multiple to-be-recommended applications may be determined. The download times and the user use times are converted to be in the same order of magnitude, to obtain converted download times and converted user use times. Weighting calculation is performed on the converted download times, to obtain a download sorting weighted value, and weighting calculation is performed on the converted user use times, to obtain a use sorting weighted value. Based on the download sorting weighted value and the use sorting weighted value of each application, a sorting value of each application is determined. Then, based on the sorting value of each application, a sequence of the multiple applications on an application recommendation interface is determined. Thus, the multiple to-be-recommended applications are recommended on the application recommendation interface in the sequence, thereby achieving recommendation of the multiple to-be-recommended applications. In the embodiments of the present disclosure, the sequence of applications on an application recommendation interface is determined based on download times and user use times, thereby improving a matching degree between the application recommendation position and the popularity and prevalence of the application at the user level. Therefore, through the application recommendation interface, the user can more easily find an application with a high popularity and prevalence.

BRIEF DESCRIPTION OF THE DRAWINGS

The accompanying drawings needed to be used in the description of the embodiments are described briefly as follows, so that the technical solutions according to the embodiments in the present disclosure become clearer. The accompanying drawings in the following description related to only some embodiments of the present disclosure. For those skilled in the art, other drawings may be obtained according to these accompanying drawings without any creative work.

DETAILED DESCRIPTION OF THE EMBODIMENTS

The technical solution according to the embodiments of the present disclosure are described clearly and completely as follows in conjunction with the accompanying drawings in the embodiments of the present disclosure. Apparently, the described embodiments are only a part of the embodiments according to the present disclosure. All the other embodiments obtained by those skilled in the art based on the embodiments in the present disclosure without any creative work fall within the scope of the present disclosure.

Figure 1:
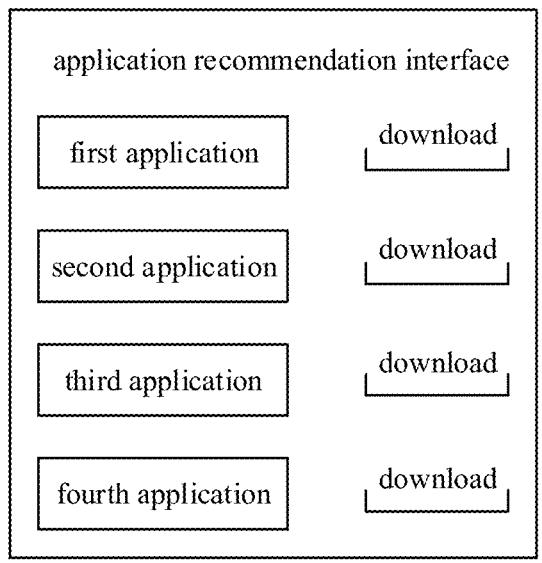
FIG. 1 is a schematic diagram of an application recommendation interface.
Figure 2:
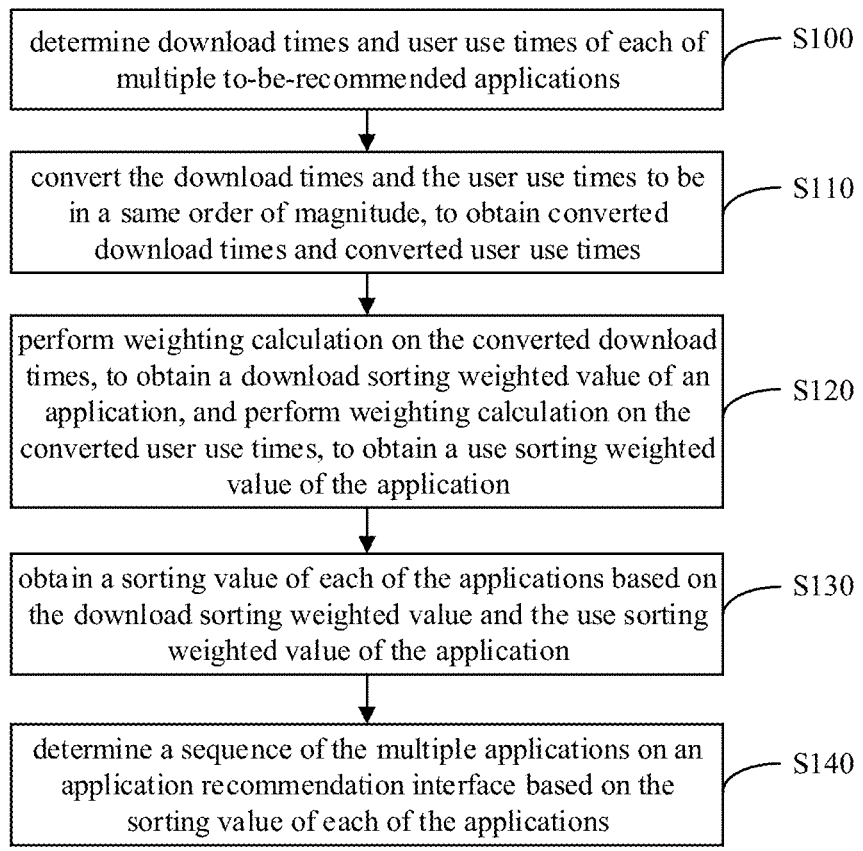
FIG. 2 is a flow chart of an application recommendation method according to an embodiment of the present disclosure.

FIG. 2 is a flow chart of an application recommendation method according to an embodiment of the present disclosure. The method may be applied to a server. The server may be a server for an application download platform, or a server integrating data of multiple application download platforms. The server may be a single server, or a server group constituted by multiple servers.

Referring to FIG. 2, the method may include steps S100 to S140.

In step S100, download times and user use times of each of multiple to-be-recommended applications are determined.

The multiple to-be-recommended applications may be applications that need to be recommended on a home page of an application download platform, or applications that need to be recommended on a specific class interface of an application download platform. The multiple to-be-recommended applications may be determined based on actual demand.

In an embodiment of the present disclosure, the user use times of an application may be determined by monitoring the use of the application. For example, a terminal device may be configured to upload use times of loaded applications to a server, and the server may count use times of each application uploaded by each terminal device.

In step S110, the download times and the user use times are converted to be in the same order of magnitude, to obtain converted download times and converted user use times.

Since download times and user use times of an application may not be in the same order of magnitude, the download times and the user use times of each of the multiple to-be-recommended applications may be converted to be in a comparable order of magnitude according to the embodiment of the present disclosure, so that when application recommendation is performed, the download times and the user use times of the application may be combined to compare. The conversion results are the converted download times and the converted user use times of each application.

Optionally, in the embodiment of the present disclosure, applications may be sorted based on the download times of each application, and sorted based on the user use times of each application. Hence, the download times of each application are converted into a sorting ordinal number of download times, and the user use times of each application are converted into a sorting ordinal number of user use times, so that the download times and the user use times of each application are converted to be in the same order of magnitude.

In an embodiment of the present disclosure, in order to ensure that a weight of download times and a weight of use times correspond to a sorting of download times and a sorting of use times, the applications may be sorted in an ascending order of the download times of the applications such that an application having a greater down times has a greater sorting ordinal number of download times. The applications may be sorted in an ascending order of the use times of the applications, such that an application having a greater use times has a greater sorting ordinal number of use times. Then, a sorting ordinal number of download times of each application is determined as a magnitude of download times of each application, and a sorting ordinal number of use times of each application is determined as a magnitude of use times of each application.

Apparently, according to the embodiment of the present disclosure, download times of an application may also be substituted into a preset formula for converting the download times of the application to be in the same order of magnitude as user use times, so that the download times converted by the formula is in the same order of magnitude as the user use times. In this case, the user use times of the application may be used as the converted user use times.

On the contrary, user use times of an application may also be substituted into a preset formula for converting the user use times of the application into the same order of magnitude as download times, so that the user use times converted by the formula is in the same order of magnitude with the download times. In this case, the download times of the application may be used as the converted download times.

In step S120, weighting calculation is performed on the converted download times, to obtain a download sorting weighted value of an application, and weighting calculation is performed on the converted user use times, to obtain a use sorting weighted value of the application.

In an embodiment of the present disclosure, a download weight and a use weight may be set and adjusted according to actual situation. Specifically, if an application recommendation strategy is that a priority of download times is higher than a priority of user use times, a weight of the converted download times may be greater than a weight of the converted user use times. If an application recommendation strategy is that a priority of user use times is higher than a priority of download times, a weight of the converted user use times may be greater than a weight of the converted download times.

In step S130, based on the download sorting weighted value and the use sorting weighted value of each of the multiple applications, a sorting value of the application is obtained.

Optionally, for each application, the download sorting weighted value may be added to the use sorting weighted value, to obtain the sorting value.

In step S140, based on the sorting value of each application, a sequence of the multiple applications on an application recommendation interface is determined.

Optionally, a large sorting value of an application indicates that the application is popular and prevalent at a user level. According to a principle that if a sorting value of an application is greater, the application is sorted more forward on the application recommendation interface, and if a sorting value of an application is smaller, the application is sorted more backward on the application recommendation interface, a sequence of the applications on the application recommendation interface is determined based on the sorting value of each application.

When the sequence of recommendation positions is determined, the presentation of the recommended applications on the application recommendation interface is determined. The sequence of the multiple to-be-recommended applications on the application recommendation interface may be adjusted based on the sorting result, to recommend the multiple to-be-recommended applications.

In the application recommendation method according to the embodiment of the present disclosure, in recommending multiple to-be-recommended applications, download times and user use times of each of the multiple to-be-recommended applications may be determined. The download times and the user use times are converted to be in the same order of magnitude, to obtain converted download times and converted user use times of each application. Then, weighting calculation is performed on the converted download times of each application, to obtain a download sorting weighted value of each application, and weighting calculation is performed on the converted user use times of each application, to obtain a use sorting weighted value of each application. Based on the download sorting weighted value and the use sorting weighted value of each application, a sorting value of each application is determined. Then, based on the sorting value of each application, a sequence of the multiple applications on an application recommendation interface is determined. Thus, the multiple to-be-recommended applications are recommended on the application recommendation interface in the sequence, thereby achieving recommendation of the multiple to-be-recommended applications. In the embodiments of the present disclosure, the download times and user use times of each application are combined to determine a recommendation position of the application on the application recommendation interface, thereby improving a matching degree between the application recommendation position and the popularity and prevalence of the application at the user level. Therefore, through the application recommendation interface, the user can more easily find an application with high popularity and prevalence.

In an embodiment of the present disclosure, download times of an application may be download times of the application in a certain time interval, while the user use times of an application may be user use times of the application from the release of the application to the present. In this way, a short-term effect of the download times and a long-term effect of use times are combined to determine the sequence of the applications on the application recommendation interface. Apparently, the download times and the user use times of the application may both be those from the release to the present, or the download times and the user use times of the application may both be those in a certain time interval.

Optionally, according to an embodiment of the present disclosure, applications may be recommended for a single application download platform. In this case, the download times of each of the multiple to-be-recommended applications may be the times of each of the multiple to-be-recommended applications downloaded via the application download platform. Accordingly, the server may only count the user use times of applications downloaded from the application recommendation platform, which is uploaded by the terminal device.

Optionally, in an embodiment of the present disclosure, data of multiple application download platforms may be combined to recommend applications provided by the multiple application download platforms. In this case, the server may acquire and sum download times of each of the multiple to-be-recommended applications from each application download platform, to obtain a total download times of each application from the multiple application download platforms. Specifically, the server may be provided with an interface exchanging data with the multiple application download platforms, to acquire the download times of each of the multiple to-be-recommended applications from each application download platform via the interface.

Similarly, the server may count use times of applications downloaded from the multiple application download platforms, which is uploaded by the terminal device.

Apparently, in an embodiment of the present disclosure, applications may be recommended without distinguishing application download platforms. In this case, since there are many application download platforms providing application download services, and data of each application download platform is relatively non-shared, it is required to provide the server with data exchanging interfaces with as many application download platforms as possible, to collect download times of applications, thereby improving accuracy of determined download times of each application. This case has a significant advantage that, the user use times of an application is determined by only monitoring the use times of the application without considering the application download source.

Figure 3:
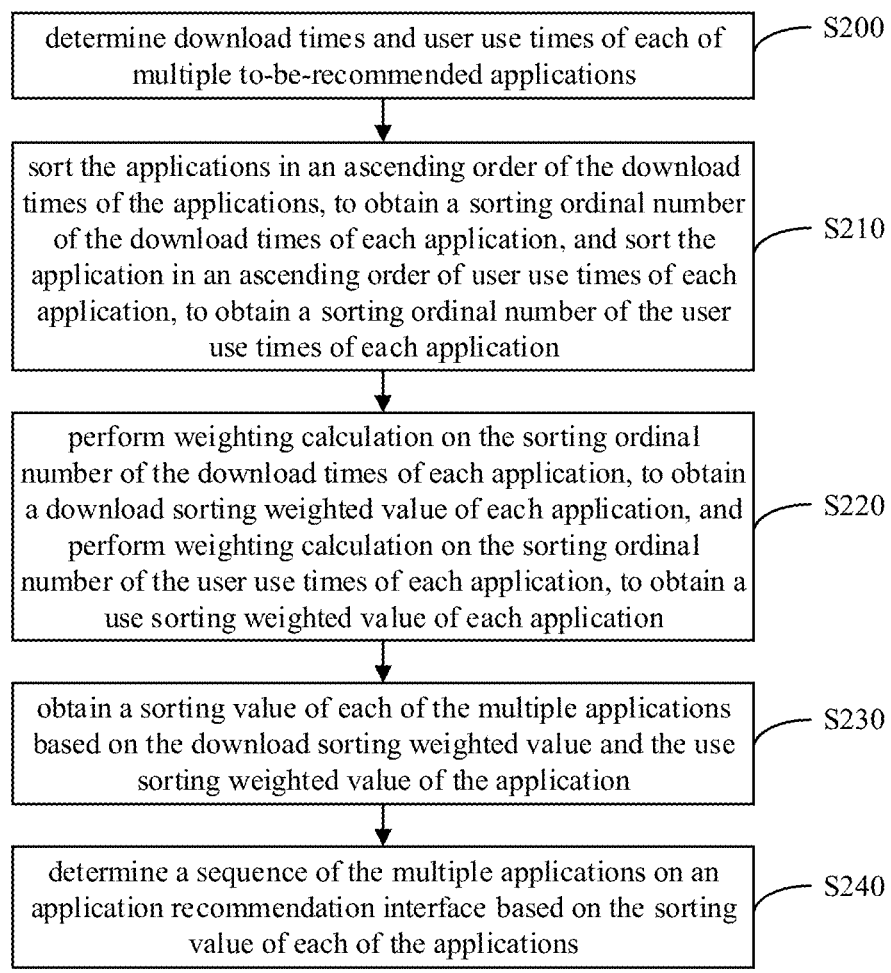
FIG. 3 is a flow chart of an application recommendation method according to another embodiment of the present disclosure.

In another embodiment, the download times and user use times of each application may be converted to be in the same order of magnitude by determining a sequence of the download times and a sequence of the use times of the applications. FIG. 3 is a flow chart of an application recommendation method according to another embodiment of the present disclosure. Referring to FIG. 3, the method may include steps S200 to S240.

In step S200, download times and user use times of each of multiple to-be-recommended applications are determined.

In step S210, the applications are sorted in an ascending order of the download times of the applications, to obtain a sorting ordinal number of the download times of each application, and the application is sorted in an ascending order of the user use times of the applications, to obtain a sorting ordinal number of the user use times of each application.

In step S220, weighting calculation is performed on the sorting ordinal number of the download times of each application, to obtain a download sorting weighted value of each application, and weighting calculation is performed on the sorting ordinal number of the user use times of each application, to obtain a use sorting weighted value of each application.

In step S230, a sorting value of each application is obtained according to the download sorting weighted value and the use sorting weighted value of each application.

In step S240, based on the sorting value of each application, a sequence of the multiple applications on an application recommendation interface is determined.

The method shown in FIG. 3 is described with an example that download times of application A is 2 million, user use times of application A is 20 million, download times of application B is 3 million, user use times of application B is 10 million, download times of application C is 4 million, and user use times of application C is 150 million. The download times of applications A, B and C may be download times in a certain time interval, such as one week, and the user use times of applications A, B and C may be data from the release of the applications to present.

Based on the download times of applications A, B and C, a sequence (from low to high) of download times may be determined as A, B and C. A sorting ordinal number of the download times of application C is 3, a sorting ordinal number of the download times of application B is 2, and a sorting ordinal number of the download times of application A is 1. The application having greater download times has a greater corresponding sorting ordinal number.

Meanwhile, based on the user use times of applications A, B and C, a sequence (from low to high) of use times may be determined as B, A and C. A sorting ordinal number of the use times of application C is 3, a sorting ordinal number of the use times of application A is 2, and a sorting ordinal number of the use times of application B is 1. The application having greater use times has greater corresponding sorting ordinal number.

If a priority of download times of an application is higher than a priority of user use times, a download weight is greater than a use weight. For example, the download weight is set as 0.8, and the use weight is set as 0.2. A sorting weight and a recommendation position arrangement of applications A, B and C are shown in Table 1.

TABLE 1

| application | sorting ordinal number of download times (increased with download times) | sorting ordinal number of use times (increased with use times) | download weight | use weight | download sorting weighted value | use sorting weighted value | sorting value | sorting (if the sorting value is greater, the sorting position is more forward) |
|---|---|---|---|---|---|---|---|---|
| A | 1 | 2 | 0.8 | 0.2 | 0.8 | 0.4 | 1.2 | 3 |
| B | 2 | 1 | 0.8 | 0.2 | 1.6 | 0.2 | 1.8 | 2 |
| C | 3 | 3 | 0.8 | 0.2 | 2.4 | 0.6 | 3 | 1 |

If the priority of user use times of an application is higher than the priority of download times, the use weight is greater than the download weight. For example, the use weight is set as 0.8, and the download weight is set as 0.2. A sorting weight and a recommendation position arrangement of applications A, B and C are shown in Table 2.

TABLE 2

| application | sorting ordinal number of download times (increased with download times) | sorting ordinal number of use times (increased with use times) | download weight | use weight | download sorting weighted value | use sorting weighted value | sorting value | sorting (if the sorting value is greater, the sorting position is more forward) |
|---|---|---|---|---|---|---|---|---|
| A | 1 | 2 | 0.2 | 0.8 | 0.2 | 1.6 | 1.8 | 2 |
| B | 2 | 1 | 0.2 | 0.8 | 0.4 | 0.8 | 1.2 | 3 |
| C | 3 | 3 | 0.2 | 0.8 | 0.6 | 2.4 | 3 | 1 |

Optionally, besides the manner that the download times and the user use times of each application are converted to be in the same order of magnitude by determining the sorting ordinal number of the download times and the sorting ordinal number of the user use times, another manner may be adopted according to an embodiment of the present disclosure, that is, download times of an application also be substituted into a preset formula for converting the download times of the application to be in the same order of magnitude as user use times, so that the download times converted by the formula is in the same order of magnitude as the user use times. In this case, the user use times of the application may be used as the converted user use times.

For example, the download times of application A is 2 million, and the user use times of application A is 20 million. The download times 2 million of application A may be substituted into a preset formula, so that a conversion result of the download times of application A is in the same order of magnitude as the user use times of application A.

Apparently, the user use times of each application may be converted to be in the same order of magnitude as the download times.

Figure 4:
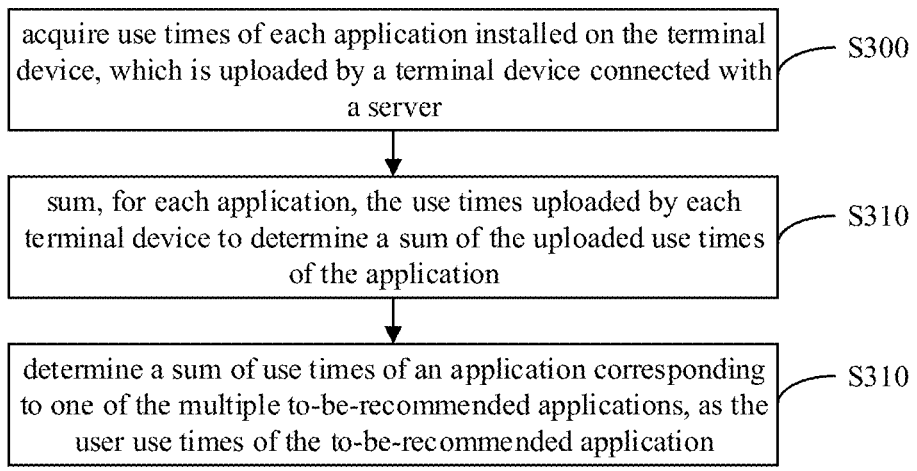
FIG. 4 is a flow chart of a method for determining user use times of each of multiple to-be-recommended applications according to an embodiment of the present disclosure.

In an embodiment of the present disclosure, the user use times of each application may be determined through monitoring the use of the application. FIG. 4 is a flow chart of a method for determining user use times of each of multiple to-be-recommended applications according to an embodiment of the present disclosure. Referring to FIG. 4, the method may include steps S300 to S320.

In step S300, use times of each application installed on a terminal device are acquired. The use times is uploaded by the terminal device in communication connection with a server.

Optionally, the terminal device records and uploads the user times of a loaded application each time when the application is used. Specifically, when the application of the terminal device is used, the terminal device may record an application identifier of the application, record the use times of the application as 1, and upload the recorded application identifier and the use times to the server. The server may increase the recorded use times of the application corresponding to the application identifier by 1.

Optionally, the terminal device may also record use times of a loaded application during a predetermined time period, and uploads the recorded use times of the loaded application during the predetermined time period. Specifically, during the predetermined time period, once an application of the terminal device is used, the terminal device may record an application identifier of the application, and increase the use times of the application recorded during the predetermined time period by 1. The application identifier and the corresponding use times during the predetermined time period may be obtained in this way and uploaded to the server. Based on the uploaded use times, the server may update the use times of the application corresponding to the application identifier recorded on the server.

For example, during one hour, the terminal device records that application A is used three times and application B is used twice. After receiving information uploaded by the terminal device, the server increases recorded use times of application A by 3 with reference to the application identifier of application A, and increases recorded use times of application B by 2.

Optionally, the use times of applications recorded by the server may be regarded as historical use times of the application counted by the server based on information uploaded by each terminal device.

In step S310, for each application, the use times uploaded by each terminal device is summed to determine a sum of the uploaded use times of the application.

In step S320, a sum of uploaded use times of an application corresponding to one of the multiple applications is determined as the user use times of the to-be-recommended application.

The server may acquire the use times of each application uploaded by each terminal device and count the use times of the application, thereby determining the user use times of each of the multiple to-be-recommended applications from the counted use times of each application.

For example, the count result of the server is that use times of application A is 10 million, use times of application B is 20 million, and use times of application C is 30 million. To-be-recommended applications are applications B and C. Hence, the use times of applications B and C is determined.

Optionally, the server may synthesize data of at least one application download platform to recommend applications. The at least one application download platform includes one application download platform or multiple application download platforms. Correspondingly, the determined user use times of each of the multiple to-be-recommended applications corresponds to the at least one application download platform.

Figure 5:
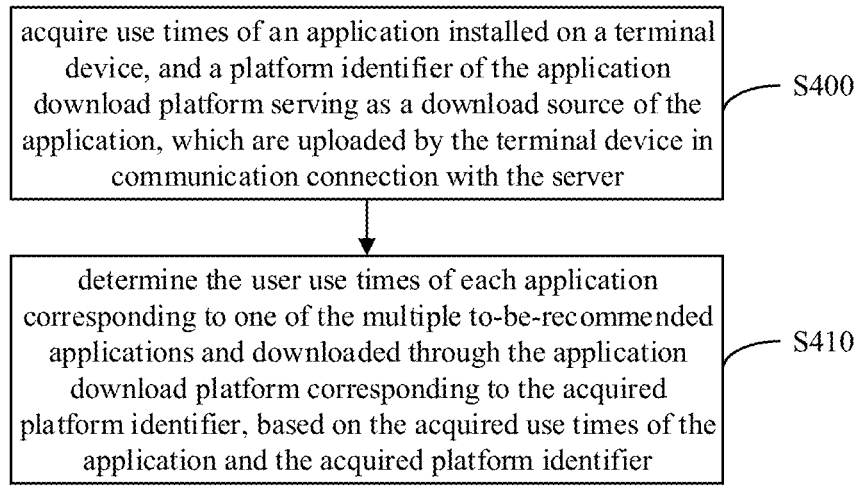
FIG. 5 is a flow chart of a method for determining user use times of each of multiple to-be-recommended applications according to another embodiment of the present disclosure.

FIG. 5 is a flow chart of a method for determining user use times of each of multiple to-be-recommended applications according to another embodiment of the present disclosure. Referring to FIG. 5, the method may include steps S400 to S410.

In step S400, use times of an application installed on a terminal device and a platform identifier of an application download platform are acquired. The use times and the platform identifier are uploaded by the terminal device in communication connection with the server, and the application download platform serves as a download source of the application.

Optionally, the terminal device records the use times each time when a loaded application is used and uploads the use times together with the platform identifier of the application download platform corresponding to the application. Specifically, once an application of the terminal device is used, the terminal device may record an application identifier of the application, record a platform identifier of the application download source, and record the use times of the application as 1. The terminal device uploads the recorded application identifier, the recorded platform identifier and the use times to the server. The server may increase, by 1, the recorded use times of the application corresponding to the recorded platform identifier and corresponding to the application identifier.

Optionally, the terminal device may also record the use times of a loaded application during a predetermined time period and the platform identifier of a corresponding application download platform, and upload recorded use times of applications corresponding to each platform identifier during the predetermined time period. Specifically, during the predetermined time period, each time when an application of the terminal device is used, the terminal device may record an application identifier of the application and a corresponding platform identifier, and increase recorded use times of the application during the predetermined time period by 1. The terminal device may upload the application identifier, the platform identifier and the corresponding use times during the predetermined time period to the server. The server may add the use time uploaded by the terminal device to the recorded use times corresponding to the platform identifier and the application identifier uploaded by the terminal device.

For example, during the predetermined time period, the terminal device records that application A is used three times and application B is used four times, and a download platform of application A is m, and a download platform of application B is n. Then, the terminal device may upload an application identifier of application A, the platform identifier m, the use times 3 of application A during the predetermined time period, an application identifier of application B, the platform identifier n, and the use times 4 of application B during the predetermined time period to the server. The server may add the use times of application A corresponding to the recorded platform identifier m by 3, and add the use times of application B corresponding to the recorded platform identifier n by 4.

In step S410, based on the acquired use times of the application and the acquired platform identifier, user use times of an application is determined, where the application corresponds to one of the multiple to-be-recommended applications and is downloaded through the application download platform corresponding to the acquired platform identifier.

For example, after receiving use times and a platform identifier of various applications uploaded by various terminal devices, the server determines that the use times of application A corresponding to the platform identifier m is 10 million, the use times of application B corresponding to the platform identifier m is 5 million, and the use times of application B corresponding to the platform identifier n is 3 million. In this example, application recommendation is performed only based on data of the application download platform m. Then the server may determine the use times of to-be-recommended applications A and B as follows. The use times of application A corresponding to the platform identifier m is 10 million, and the use times of application B corresponding to the platform identifier m is 5 million.

Figure 6:
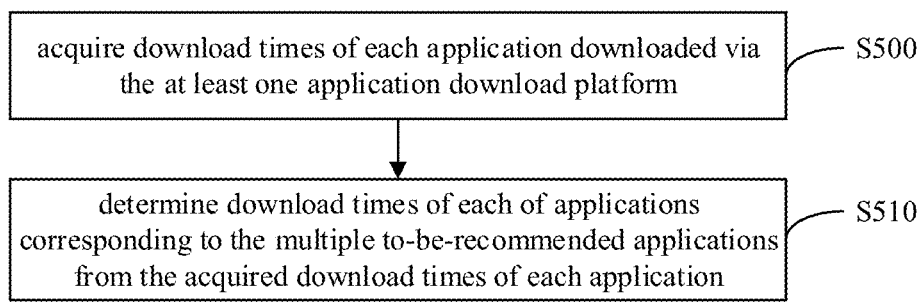
FIG. 6 is a flow chart of a method for determining download times of each of multiple to-be-recommended applications according to an embodiment of the present disclosure.

Optionally, in a case that the server synthesizes data of at least one application download platform to recommend applications, the determined user use times of each of the multiple to-be-recommended applications corresponds to the at least one application download platform. FIG. 6 is a flow chart of a method for determining download times of each of multiple to-be-recommended applications according to an embodiment of the present disclosure. Referring to FIG. 6, the method may include steps S500 to S510.

In step S500, the download times of each application downloaded via the application download platform is acquired.

In step S510, download times of each of applications corresponding to the multiple to-be-recommended applications is determined from the acquired download times of each application.

Figure 7:
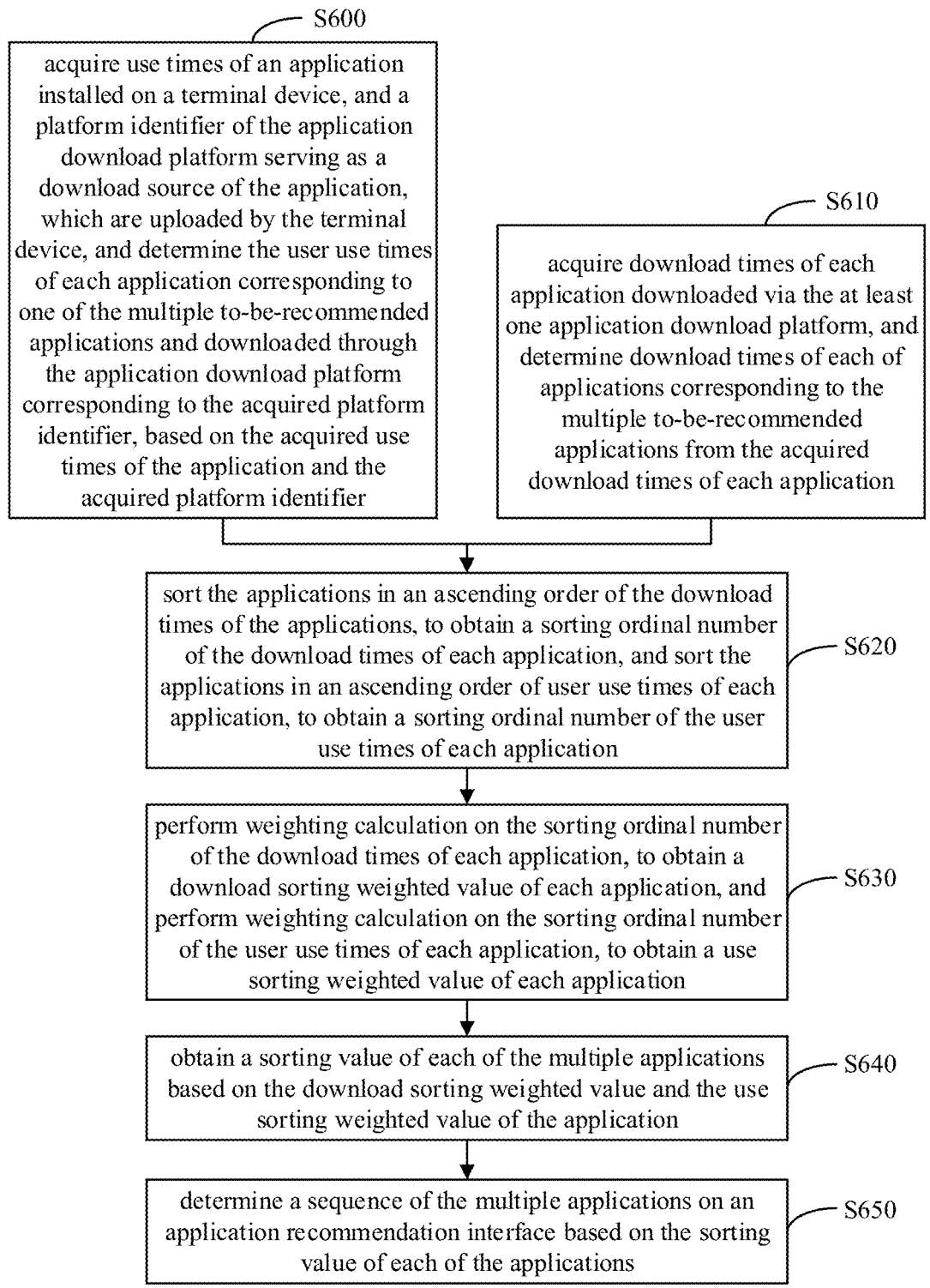
FIG. 7 is a flow chart of an application recommendation method according to another embodiment of the present disclosure.

Optionally, FIG. 7 is a flow chart of an application recommendation method according to another embodiment of the present disclosure. Referring to FIG. 7, the method may include steps S600 to S650.

In step S600, use times of each application installed on a terminal device and a platform identifier of the application download platform serving as a download source of the application, which are uploaded by the terminal device, are acquired; and based on the acquired use times of the application and the acquired platform identifier, it is determined the user use times of each of applications corresponding to the multiple to-be-recommended applications and downloaded through the application download platform corresponding to the acquired platform identifier.

In step S610, the download times of each application downloaded via each application download platform are acquired, and download times of each of applications corresponding to the multiple to-be-recommended applications is determined from the acquired download times of each application.

Optionally, step S600 and step S610 may be performed in any order.

In step S620, the applications are sorted in an ascending order of the download times of the applications, to obtain a sorting ordinal number of the download times of each application, and the applications are sorted in an ascending order of the user use times of each application, to obtain a sorting ordinal number of the user use times of each application.

In step S630, weighting calculation is performed on the sorting ordinal number of the download times of each application, to obtain a download sorting weighted value of each application, and weighting calculation is performed on the sorting ordinal number of the user use times of each application, to obtain a use sorting weighted value of each application.

In step S640, a sorting value of each application is obtained based on the download sorting weighted value and the use sorting weighted value of each application.

In step S650, based on the sorting value of each application, a sequence of the multiple applications on an application recommendation interface is determined.

Apparently, in an embodiment of the present disclosure, applications may be recommended without distinguishing application download platforms.

Optionally, in the application recommendation method according to the embodiment of the present disclosure, the recommendation positions of the applications on the application recommendation interface may be updated periodically. For example, the application recommendation method according to the embodiment of the present disclosure may be executed once per hour, to update the recommendation positions of the applications on the application recommendation interface. Apparently, the recommendation positions of the applications on the application recommendation interface may also be updated in a real-time manner.

Optionally, the application recommendation method according to the embodiments of the present disclosure may be applied to recommend an expression package application. Hereinafter, the expression package application is taken as an example to describe the application recommendation method according to the embodiments of the present disclosure.

The server may update recorded download times and recorded user use times of each expression package application in a real-time or periodical manner. Optionally, download times and user use times may be recorded and updated only for expression package applications downloaded from at least one application download platform.

In monitoring user use times of each expression package application, each time when an expression in an expression package application is used, the expression package application is determined as being used once. Correspondingly, each time when any expression of a loaded expression package application is used, the terminal device may record and upload the use time of the expression package application. Alternatively, based on the principle that each time when any one expression in an expression package application is used, the expression package application is determined as being used once, the terminal device may record use times of each loaded expression package application during a predetermined time period, and uploaded the recorded use times of each loaded expression package application during the predetermined time period.

When the server determines that a sorting on an application recommendation interface for an expression package application download platform needs to be updated, the server may determine download times and user use times of each of multiple to-be-recommended expression package applications from recorded download times and recorded user use times of each expression package application.

By means of determining a sorting of download times and a sorting of use times of each to-be-recommended expression package application, the download times and user use times of each of the multiple to-be-recommended expression package applications are converted to be in the same order of magnitude, to obtain converted download times and converted user use times of each to-be-recommended application.

Weighting calculation is performed on the converted download times of each to-be-recommended expression package application, to obtain a download sorting weighted value of each to-be-recommended expression package application, and weighting calculation is performed on the converted use times of each to-be-recommended expression package application, to obtain a use sorting weighted value of each to-be-recommended expression package application.

Based on the download sorting weighted value and the use sorting weighted value of each to-be-recommended expression package application, a sorting value of each to-be-recommended expression package application is obtained.

Based on the sorting value of each to-be-recommended expression package application, a sequence of the to-be-recommended expression package applications on an application recommendation interface is determined.

In the embodiments of the present disclosure, download times is combined with user use times of an application, to determine recommendation positions of the applications on an application recommendation interface, thereby improving a matching degree between the application recommendation position and the popularity and prevalence of the application at the user level. Thus, the determined application recommendation position better matches the real use situation of the application, thereby improving the appropriateness of application recommendation position arrangement, and thus improving the appropriateness of application recommendation. Therefore, through the application recommendation interface, the user can more easily find an application with a high popularity and prevalence.

A server according to an embodiment of the present disclosure is described hereinafter, the server described below may be refer to the application recommendation method described above.

Figure 8:
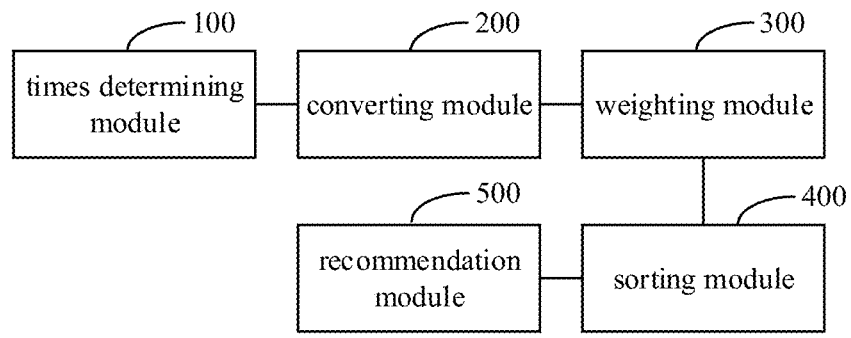
FIG. 8 is a structural schematic diagram of a server according to an embodiment of the present disclosure.

FIG. 8 is a structural schematic diagram of a server according to an embodiment of the present disclosure. Referring to FIG. 8, the server may include a times determining module 100, a converting module 200, a weighting module 300, a sorting module 400 and a recommendation module 500.

The times determining module 100 is configured to determine download times and user use times of each of multiple to-be-recommended applications.

The converting module 200 is configured to convert the download times and the user use times to be in a same order of magnitude, to obtain converted download times and converted user use times.

The weighting module 300 is configured to perform weighting calculation on the converted download times, to obtain a download sorting weighted value of each application, and perform weighting calculation on the converted user use times, to obtain a use sorting weighted value of each application.

The sorting module 400 is configured to obtain a sorting value of each of the applications based on the download sorting weighted value and the use sorting weighted value of the application.

The recommendation module 500 is configured to determine a sequence of the multiple applications on an application recommendation interface based on the sorting value of each of the applications.

Figure 9:
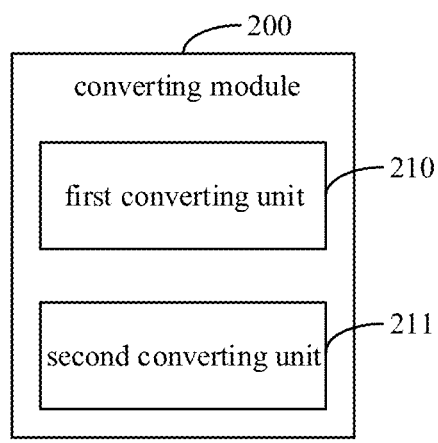
FIG. 9 is a structural schematic diagram of a converting module according to an embodiment of the present disclosure.

Optionally, FIG. 9 shows an optional structure of the converting module 200 according to an embodiment of the present disclosure. Referring to FIG. 9, the converting module 200 may include a first converting unit 210 and a second converting unit 211.

The first converting unit 210 is configured to sort the applications in an ascending order of the download times of the applications, and determine a sorting ordinal number of the download times of each of the applications as the converted download times of the application.

The second converting unit 211 is configured to sort applications in an ascending order of the user use times of the applications, and determines a sorting ordinal number of the user use times of each of the applications as the converted use times of the application.

Figure 10:
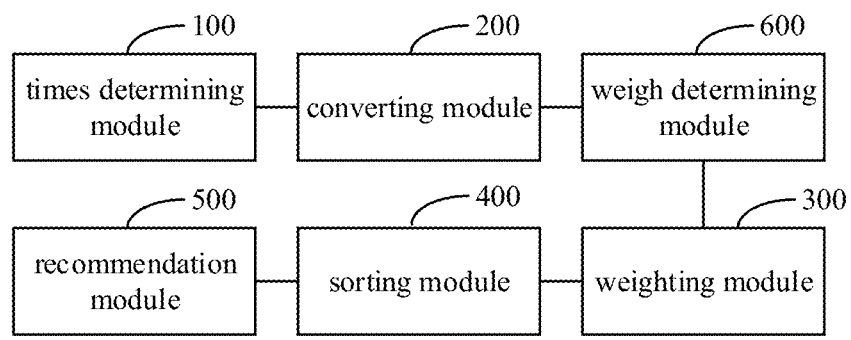
FIG. 10 is a structural schematic diagram of a server according to another embodiment of the present disclosure.

As shown in FIG. 10, the server according to the present disclosure may also include a weight determining module 600.

The weight determining module 600 is configured to determine a weight of the converted download times and a weight of the converted user use times. If a priority of the download times is higher than a priority of the user use times, the weight of the converted download times is set to be greater than the weight of the converted user use times. If the priority of the user use times is higher than the priority of the download times, the weight of the converted user use times is set to be greater than the weight of the converted download times.

Figure 11:
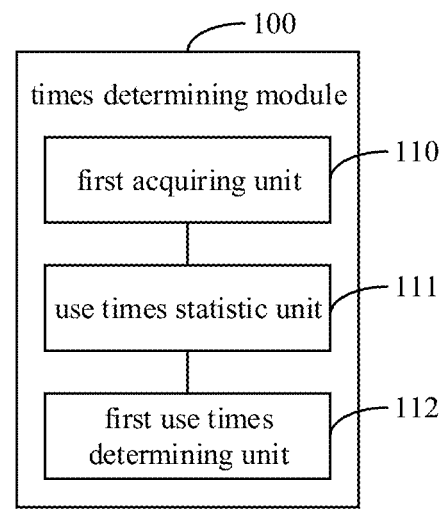
FIG. 11 is a structural schematic diagram of a times determining module according to an embodiment of the present disclosure.

Optionally, FIG. 11 shows an optional structure of the times determining module 100 according to an embodiment of the present disclosure. Referring to FIG. 11, the times determining module 100 may include a first acquiring unit 110, a user times statistic unit 111 and a first use times determining unit 112.

The first acquiring unit 110 is configured to acquire use times of an application loaded on a terminal device, which is uploaded by the terminal device in communication connection with the server.

The user times statistic unit 111 is configured to sum, for each application, the use times uploaded by each terminal device to determine a sum of the uploaded use times of the application.

The first use times determining unit 112 is configured to determine a sum of use times of an application corresponding to one of the multiple to-be-recommended applications, as the user use times of the to-be-recommended application.

Each time when a loaded application is used, the terminal device records and uploads the user times. Alternatively, the terminal device records use times of a loaded application during a predetermined time period, and when the predetermined time period expires, the terminal device uploads the use times of the loaded application during the predetermined time period.

Figure 12:
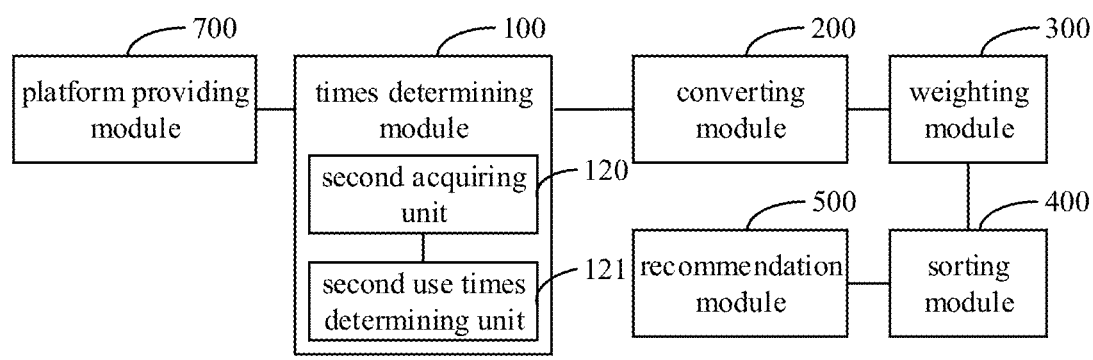
FIG. 12 is a structural schematic diagram of a server according to another embodiment of the present disclosure.

FIG. 12 is a schematic diagram of a server according to an embodiment of the present disclosure. The server may also include a platform providing module 700.

The platform providing module 700 is configured to provide at least one application download platform, to download one or more of the multiple to-be-recommended applications.

The times determining module 100 may include a second acquiring unit 120 and a second use times determining unit 121.

The second acquiring unit 120 is configured to acquire use times of an application loaded on a terminal device, and a platform identifier of the application download platform serving as a download source of the application, which are uploaded by the terminal device in communication connection with the server.

The second use times determining unit 121 is configured to determine the user use times of each application corresponding to one of the multiple to-be-recommended applications and downloaded through the application download platform corresponding to the acquired platform identifier, based on the acquired use times of the application and the acquired platform identifier.

Each time when a loaded application is used, the terminal device records and uploads the use times together with the platform identifier of the application download platform corresponding to the application. Alternatively, the terminal device records use times of a loaded application during a predetermined time period and the platform identifier of the application download platform corresponding to the application. When the predetermined time period expires, the terminal device uploads the use times of the loaded application during the predetermined time period and the platform identifier of the application download platform corresponding to the application.

Figure 13:
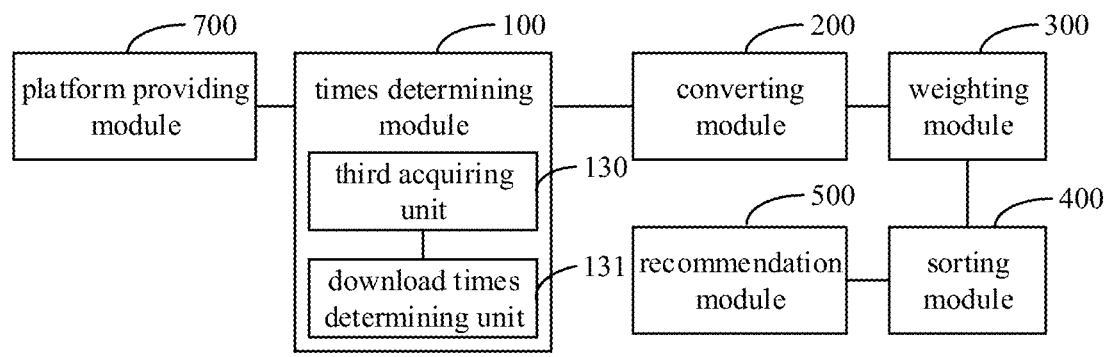
FIG. 13 is a structural schematic diagram of a server according to another embodiment of the present disclosure.

FIG. 13 is a schematic diagram of a server according to an embodiment of the present disclosure. The server may also include a platform providing module 700.

The platform providing module 700 is configured to provide at least one application download platform, to download one or more of the multiple to-be-recommended applications.

The times determining module 100 may include a third acquiring unit 130 and a download times determining unit 131.

The third acquiring unit 130 is configured to acquire download times of each application downloaded via the application download platform.

The download times determining unit 131 is configured to determine download times of each of applications corresponding to the multiple to-be-recommended applications from the acquired download times of each application.

Optionally, the embodiment of the present disclosure may be applied to a recommendation for an expression package application. Accordingly, each of the applications is an expression package application, the download times of the application is download times of the expression package application, and the user use times of the application is a user use times of the expression package application. Each time when any one expression in the expression package application is used, it is determined that the expression package application is used once.

Figure 14:
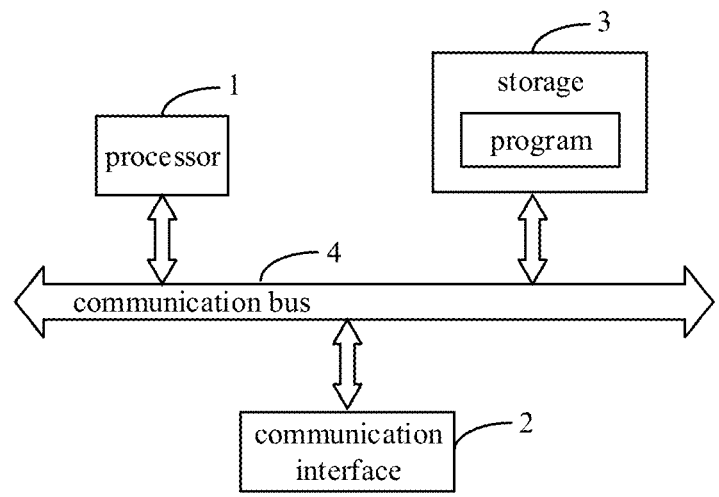
FIG. 14 is a hardware structural schematic diagram of a server according to an embodiment of the present disclosure.

Further, a server according to an embodiment of the present disclosure may be implemented in hardware. FIG. 14 is a hardware structural schematic diagram of a server according to an embodiment of the present disclosure. Referring to FIG. 14, the server may include a processor 1, a communication interface 2, a storage 3 and a communication bus 4.

The processor 1, the communication interface 2 and the storage 3 communicate with each other via the communication bus 4.

Optionally, the communication interface 2 may be an interface of a communication module, such as an interface of a GSM module.

The processor 1 is configured to execute a program.

The storage 3 is configured to store a program.

The program may include program codes. And the program codes include computer operation instructions.

The processor 1 may be a central processing unit CPU, or a specific ASIC (Application Specific Integrated Circuit), or one or more integrated circuits configured to implement embodiments of the present disclosure.

The storage 3 may include a high speed RAM storage, and may also include a non-volatile memory, such as at least one disk storage.

Specifically, the program may be configured to:

determine download times and user use times of each of multiple to-be-recommended applications;

convert the download times and the user use times to be in a same order of magnitude, to obtain converted download times and converted user use times;

perform weighting calculation on the converted download times, to obtain a download sorting weighted value of the application, and perform weighting calculation on the converted user use times, to obtain a use sorting weighted value of the application;

obtain a sorting value of each of the applications based on the download sorting weighted value and the use sorting weighted value of the application; and determine a sequence of the multiple applications on an application recommendation interface based on the sorting value of each of the applications.

In the present disclosure, the server may determine recommendation sorting positions of applications on an application recommendation interface by combining the download times and user use times, thereby improving a matching degree between the application recommendation position and the popularity and prevalence of the application at the user level. Then the set application recommendation position better matches the real popular situation of the application, thereby improving the appropriateness of application recommendation position arrangement, and thus improving the appropriateness of application recommendation. Therefore, through the application recommendation interface, the user can more easily find an application with a high popularity and prevalence.

The embodiments of the present disclosure are described herein in a progressive manner, with an emphasis placed on explaining the difference between each embodiment and the other embodiments. Hence, for the same or similar parts among the embodiments, reference may be made from one another. For the device disclosed in the embodiments, the corresponding descriptions are relatively simple because the device corresponds to the method disclosed in the embodiments. For relevant portions, reference may be made to the description for the method.

The skilled persons will also appreciate that the elements and algorithm steps of each of the examples described in connection with the embodiments disclosed herein can be implemented in an electronic hardware, a computer software, or a combination of the two. In order to clearly illustrate the interchangeability of hardware and software, the composition and steps of each example have been described in terms of functionality in the above description. Whether these functions are implemented in hardware or software depends on the specific application and design constraints of the technical solution. The skilled persons may implement the described functions in different ways for different applications, but such implementations should not be considered beyond the scope of the present disclosure.

Steps of methods or algorithms described in connection with the embodiments disclosed herein may be implemented directly with hardware, a software modules executed by a processor, or a combination thereof. The software module may be stored in a storage medium, such as, a random access memory (RAM), a memory, a read only memory (ROM), an electrically programmable ROM, an electrically erasable programmable ROM, a register, a hard disk, a removable disk, a CD-ROM, or any other types of storage medium well-known in the art.

The above description of the embodiments enables those skilled in the art to implement or use the present disclosure. Numerous modifications to the embodiments will be apparent to those skilled in the art, and the general principle herein can be implemented in other embodiments without deviation from the spirit or scope of the embodiments of the present disclosure. Therefore, the present disclosure will not be limited to the embodiments described herein, but in accordance with the widest scope consistent with the principle and novel features disclosed herein.

The invention claimed is:

1. An application recommendation method, comprising:
    determining download times and user use times of each of a plurality of to-be-recommended applications;
    sorting the plurality of to-be-recommended applications in an ascending order of the download times of the plurality of to-be-recommended applications, and determining a sorting ordinal number of the download times of each of the plurality of to-be-recommended applications as converted download times of each of the plurality of to-be-recommended applications;
    sorting the plurality of to-be-recommended applications in an ascending order of user use times of the plurality of to-be-recommended applications, and determining a sorting ordinal number of the user use times of each of the plurality of to-be-recommended applications as converted user use times of each of the plurality of to-be-recommended applications;
    performing weighting calculation on the converted download times, to obtain a download sorting weighted value of each of the plurality of to-be-recommended applications, and performing weighting calculation on the converted user use times, to obtain a use sorting weighted value of each of the plurality of to-be-recommended applications;
    obtaining a sorting value of each of the plurality of to-be-recommended applications based on the download sorting weighted value and the use sorting weighted value of each of the plurality of to-be-recommended applications; and
    determining a sequence of the plurality of to-be-recommended applications on an application recommendation interface based on the sorting value of each of the plurality of to-be-recommended applications,
    wherein the method is performed by a server.

2. The application recommendation method according to claim 1, wherein performing weighting calculation on the converted download times to obtain a download sorting weighted value of each of the plurality of to-be-recommended applications and performing weighting calculation on the converted user use times, to obtain a use sorting weighted value of each of the plurality of to-be-recommended applications the application comprise:
    determining a weight of the converted download times and a weight of the converted user use times, wherein
    if a priority of the download times is higher than a priority of the user use times, the weight of the converted download times is set to be greater than the weight of the converted user use times; and if the priority of the user use times is higher than the priority of the download times, the weight of the converted user use times is set to be greater than the weight of the converted download times.

3. The application recommendation method according to claim 1, wherein determining user use times of each of a plurality of to-be-recommended applications comprises:
    acquiring use times of a loaded application loaded on a terminal device, which is uploaded by the terminal device in communication connection with the server;
    summing, for each loaded application, the use times uploaded by each terminal device to determine a sum of the uploaded use times of the loaded application; and
    determining a sum of use times of each loaded application corresponding to one of the plurality of to-be-recommended applications, as the user use times of the to-be-recommended application.

4. The application recommendation method according to claim 3, wherein:
    the terminal device records and uploads the user times of the loaded application each time when the loaded application is used; or
    the terminal device records use times of the loaded application during a predetermined time period, and when the predetermined time period expires, the terminal device uploads the use times of the loaded application during the predetermined time period.

5. The application recommendation method according to claim 1, wherein:
    before determining download times and user use times of each of a plurality of to-be-recommended applications, the method further comprises:
    providing at least one application download platform, to download one or more of the plurality of to-be-recommended applications; and
    determining the user use times of each of the plurality of to-be-recommended applications comprises:
    acquiring use times of a loaded application loaded on a terminal device, and a platform identifier of the application download platform serving as a download source of the loaded application, which are uploaded by the terminal device in communication connection with the server; and
    determining the user use times of each loaded application corresponding to one of the plurality of to-be-recommended applications and downloaded through the application download platform corresponding to the acquired platform identifier, based on the acquired use times and the acquired platform identifier.

6. The application recommendation method according to claim 5, wherein:
    the terminal device records the use times each time when the loaded application is used and uploads the use times together with the platform identifier of the application download platform corresponding to the loaded application; or the terminal device records the use times of a loaded application during a predetermined time period and the platform identifier of the application download platform corresponding to the loaded application, and when the predetermined time period expires, the terminal device uploads the use times of the loaded application during the predetermined time period and the platform identifier of the application download platform corresponding to the loaded application.

7. The application recommendation method according to claim 1, wherein:

before determining download times and user use times of each of a plurality of to-be-recommended applications, the method further comprises:

providing at least one application download platform, to download one or more of the plurality of to-be-recommended applications; and determining the download times of each of the plurality of to-be-recommended applications comprises:

acquiring download times of each loaded application downloaded via the application download platform; and determining download times of each loaded application corresponding to one of the plurality of to-be-recommended applications from the acquired download times of each application.

8. The application recommendation method according to claim 1, wherein:

each of the plurality of to-be-recommended applications is an expression package application;

the download times of each of the plurality of to-be-recommended applications is download times of the expression package application;

the user use times of each of the plurality of to-be-recommended applications is user use times of the expression package application; and each time when any one expression in the expression package application is used, it is determined that the expression package application is used once.

9. A server comprising one or more processors and a memory for storing program instructions, wherein the one or more processors are configured to execute the program instructions to:

determine download times and user use times of each of a plurality of to-be-recommended applications;

sort the plurality of to-be-recommended applications in an ascending order of the download times of the plurality of to-be-recommended applications, and determine a sorting ordinal number of the download times of each of the plurality of to-be-recommended applications as converted download times of each of the plurality of to-be-recommended applications;

sort the plurality of to-be-recommended applications in an ascending order of user use times of the plurality of to-be-recommended applications, and determine a sorting ordinal number of the user use times of each of the plurality of to-be-recommended applications as converted user use times of each of the plurality of to-be-recommended applications;

perform weighting calculation on the converted download times, to obtain a download sorting weighted value of each of the plurality of to-be-recommended applications, and perform weighting calculation on the converted user use times, to obtain a use sorting weighted value of each of the plurality of to-be-recommended applications;

obtain a sorting value of each of the plurality of to-be-recommended applications based on the download sorting weighted value and the use sorting weighted value of each of the plurality of to-be-recommended applications; and determine a sequence of the plurality of to-be-recommended applications on an application recommendation interface based on the sorting value of each of the plurality of to-be-recommended applications.

10. The server according to claim 9, wherein the one or more processors are further configured to executes the program instructions to:

determine a weight of the converted download times and a weight of the converted user use times, wherein:

if a priority of the download times is higher than a priority of the user use times, the weight of the converted download times is set to be greater than the weight of the converted user use times; and if the priority of the user use times is higher than the priority of the download times, the weight of the converted user use times is set to be greater than the weight of the converted download times.

11. The server according to claim 9, wherein the one or more processors are further configured to execute the program instructions to:

acquire use times of a loaded application loaded on a terminal device, which is uploaded by the terminal device in communication connection with the server;

sum, for each loaded application, the use times uploaded by each terminal device to determine a sum of the uploaded use times of the loaded application; and determine a sum of use times of each loaded application corresponding to one of the plurality of to-be-recommended applications, as the user use times of the to-be-recommended application.

12. The server according to claim 11, wherein:

the terminal device records and uploads the user times of the loaded application each time when the loaded application is used; or the terminal device records use times of the loaded application during a predetermined time period, and when the predetermined time period expires, the terminal device uploads the use times of the loaded application during the predetermined time period.

13. The server according to claim 9, wherein the one or more processors are further configured to execute the program instructions to:

provide at least one application download platform, to download one or more of the plurality of to-be-recommended applications;

acquire use times of a loaded application loaded on a terminal device, and a platform identifier of the application download platform serving as a download source of the loaded application, which are uploaded by the terminal device in communication connection with the server; and determine the user use times of each loaded application corresponding to one of the plurality of to-be-recommended applications and downloaded through the application download platform corresponding to the acquired platform identifier, based on the acquired use times of the application and the acquired platform identifier.

14. The server according to claim 13, wherein:
the terminal device records the use times each time when the loaded application is used and uploads the use times together with the platform identifier of the application download platform corresponding to the loaded application; or the terminal device records the use times of a loaded application during a predetermined time period and the platform identifier of the application download platform corresponding to the loaded application, and when the predetermined time period expires, the terminal device uploads the use times of the loaded application during the predetermined time period and the platform identifier of the application download platform corresponding to the loaded application.

15. The server according to claim 9, wherein the one or more processors are configured to execute the program instructions to:

provide at least one application download platform, to download one or more of the plurality of to-be-recommended applications;

acquire download times of each loaded application downloaded via the application download platform; and determine download times of each loaded application corresponding to one of the plurality of to-be-recommended applications from the acquired download times of each application.

16. The server according to claim 9, wherein:

each of the plurality of to-be-recommended applications is an expression package application;

the download times of each of the plurality of to-be-recommended applications is download times of the expression package application;

the user use times of each of the plurality of to-be-recommended applications is user use times of the expression package application; and each time when any one expression in the expression package application is used, it is determined that the expression package application is used once.

17. A non-transitory computer readable medium storing instructions executable by a processor, the instructions, when executed by the processor, configure the processor to:

determine download times and user use times of each of a plurality of to-be-recommended applications;

sort the plurality of to-be-recommended applications in an ascending order of the download times of the plurality of to-be-recommended applications, and determine a sorting ordinal number of the download times of each of the plurality of to-be-recommended applications as converted download times of each of the plurality of to-be-recommended applications;

sort the plurality of to-be-recommended applications in an ascending order of user use times of the plurality of to-be-recommended applications, and determine a sorting ordinal number of the user use times of each of the plurality of to-be-recommended applications as converted user use times of each of the plurality of to-be-recommended applications;

perform weighting calculation on the converted download times, to obtain a download sorting weighted value of each of the plurality of to-be-recommended applications, and performing weighting calculation on the converted user use times, to obtain a use sorting weighted value of each of the plurality of to-be-recommended applications;

obtain a sorting value of each of the plurality of to-be-recommended applications based on the download sorting weighted value and the use sorting weighted value of each of the plurality of to-be-recommended applications; and determine a sequence of the plurality of to-be-recommended applications on an application recommendation interface based on the sorting value of each of the plurality of to-be-recommended applications.

* * * * *